(12) United States Patent
Linke et al.

(10) Patent No.: US 8,790,111 B2
(45) Date of Patent: Jul. 29, 2014

(54) DEVICE FOR BLOW-MOLDING CONTAINERS

(75) Inventors: Michael Linke, Hamburg (DE); Rolf Baumgarte, Ahrensburg (DE); Dieter Klatt, Hamburg (DE); Günther Godau, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 13/634,186

(22) PCT Filed: Feb. 18, 2011

(86) PCT No.: PCT/DE2011/000163
§ 371 (c)(1),
(2), (4) Date: Nov. 6, 2012

(87) PCT Pub. No.: WO2011/110147
PCT Pub. Date: Sep. 15, 2011

(65) Prior Publication Data
US 2013/0064921 A1    Mar. 14, 2013

(30) Foreign Application Priority Data
Mar. 11, 2010   (DE) .......... 10 2010 012 502

(51) Int. Cl.
*B29C 49/42* (2006.01)
(52) U.S. Cl.
USPC .......... 425/522; 425/405.1; 425/541
(58) Field of Classification Search
USPC ........ 425/405.1, 522, 541
See application file for complete search history.

(56) References Cited

U.S. PATENT DOCUMENTS

| | | | |
|---|---|---|---|
| 3,829,264 A * | 8/1974 | Mnilk et al. .......... | 425/541 |
| 4,076,071 A | 2/1978 | Rosenkranz et al. | |
| 5,346,386 A | 9/1994 | Albrecht et al. | |
| 5,411,391 A | 5/1995 | Albrecht et al. | |
| 5,648,026 A | 7/1997 | Weiss | |
| 6,729,868 B1 | 5/2004 | Vogel et al. | |
| 7,048,531 B2 | 5/2006 | Bianchini | |
| 8,029,270 B2 | 10/2011 | Baumgarte et al. | |

FOREIGN PATENT DOCUMENTS

| | | |
|---|---|---|
| DE | 2028009 | 12/1971 |
| DE | 2352926 | 4/1975 |
| DE | 4212583 | 10/1993 |
| DE | 4340291 | 6/1995 |
| DE | 19906438 | 8/2000 |
| DE | 19929033 | 12/2000 |
| DE | 102005017540 | 10/2006 |
| DE | 102008018785 | 10/2009 |
| EP | 0565916 X | 10/1993 |
| EP | 1312459 A | 5/2003 |
| FR | 2813231 X | 3/2002 |
| GB | 1322667 | 7/1973 |

* cited by examiner

*Primary Examiner* — Robert B Davis
(74) *Attorney, Agent, or Firm* — Lucas & Mercanti, LLP; Klaus P. Stoffel

(57) ABSTRACT

The device according to the invention is used to blow-mold containers. After thermal conditioning, a preform is shaped into the container inside a blow mold by the effect of blowing pressure. The blow mold is retained by a support. A pressure area (43) is sealed from the surroundings by a seal (41). The seal (41) has at least two areas (45, 46). A first area (45) is composed of a harder material than the second area (46). The two areas are rigidly connected to each other.

10 Claims, 6 Drawing Sheets

DEVICE FOR BLOW-MOLDING CONTAINERS

The present application is a 371 of International application PCT/DE2011/000163, filed Feb. 18, 2011, which claims priority of DE 10 2010 012 502.4, filed Mar. 11, 2010, the priority of these applications is hereby claimed and these applications are incorporated herein by reference.

BACKGROUND OF THE INVENTION

The invention pertains to a device for blow-molding containers, which comprises at least one blow-molding station with a blow mold, where the blow mold is held by a carrier of the blow-molding station, and where a pressure zone is sealed off from the environment by a seal.

In container molding by the action of a blowing pressure, parisons of thermoplastic material such a parisons of PET (polyethylene terephthalate) are sent through various processing stations within the blow-molding machine. A blow-molding machine of this type typically comprises a heating device and a blowing device, in the area of which the previously tempered parison is expanded by biaxial orientation to form a container. The expansion takes place with the help of compressed air, which is introduced into the parison to be expanded. The sequence of processing steps carried out during this expansion of the parison is explained in DE-OS 43 40 291. The previously mentioned introduction of the pressurized gas also comprises the introduction of compressed gas into the developing container bubble and the introduction of compressed gas into the parison at the beginning of the blowing step.

The basic design of a blow-molding station for molding containers is described in DE-OS 42 12 583. Possible ways of tempering the parisons are explained in DE-OS 23 52 926.

Inside the blow-molding device, the parisons and the blown containers can be transported by various handling devices. The use of transport mandrels, onto which the parisons are set, has proven to be especially effective. The parisons can also be handled by other types of support devices, however. The use of grippers to handle parisons and the use of spreading mandrels, which can be introduced into the mouth area of the parison to hold it, also number among the available alternatives.

The handling of containers with the use of transfer wheels is described in, for example, DE-OS 199 06 438; here the transfer wheel is arranged between a blowing wheel and a delivery section.

The parisons are handled as previously explained according to one of two different methods. In the case of the so-called two-stage method, the parisons are first produced by injection-molding and then stored temporarily. At a later time, they are thermally conditioned and blown into containers. The second possibility is the so-called one-stage method, in which the parisons are first produced by injection-molding and allowed to harden sufficiently and then immediately blown into containers.

Blowing stations of various designs are known. In the case of blowing stations mounted on rotating transport wheels, mold carriers which can open up like a book are frequently encountered. It is also possible, however, to use mold carriers which can be moved relative to each other or guided in some other way. In the case of stationary blowing stations, which are especially suitable for accepting multiple cavities for container molding, plates arranged parallel to each other are typically used as mold carriers.

According to the prior art, it is known that the connecting elements can be positioned either pneumatically or mechanically by the use of cam controllers. Cam controllers have been proven effective especially in the case of blow-molding machines with rotating blowing wheels, because here, as a function of rotation of the blowing wheel, the individual positions in question can be predefined by the cam controller. The use of these types of cam controllers avoids the additional consumption of compressed air.

In the area of the blowing stations, the blow molds being used are typically supported by mold carriers. The blow molds are usually divided into two side-by-side halves and a bottom mold piece. The mold carriers are typically locked together mechanically or clamped mechanically together. When the parisons are molded into containers by the action of the blowing pressure, care must taken to prevent gaps in the mold, because these could leave an impression on the container.

It is therefore known that at least one of the two halves of the blow mold can be clamped pneumatically against its assigned mold carrier in such a way that the formation of gaps in the mold can be prevented. This can be done, for example, by supplying the blowing pressure simultaneously both to the blowing station and to a pneumatic clamping device, so that, as the internal pressure in the container to be blown increases, the force holding the mold together also increases in the blow mold.

The pneumatic clamping devices which are arranged in the area of the blowing station are typically connected to their assigned control valves by connecting hoses. After a container has been produced but before the blow mold is opened, the internal pressure is released from both the blown container and the pneumatic clamping device. This is typically done with the concomitant use of sound dampers to damp the noise created by the escaping gas.

In the area of the pneumatic clamping devices, at least one cavity is provided, which must be sealed off against the environment. A sealing effect of this type is typically achieved by the use of an elastomeric material, which is realized as a profiled section extending all the way around. An example of a seal of this type is described in, for example, DE 199 29 033.4. Modern blow-molding machines are operated at high outputs per unit time. Production rates of about 2,000 bottles per hour and blow-molding station are normal. There is, however, the desire to increase these production rates even more. For the production of each container, the blow mold is first clamped shut pneumatically, and a corresponding load reversal occurs in the area of the all-around seal. The large number of load reversals leads over time to damage to the sealing material; cracks in the area of the profiled surface are especially common. These surface profilings are desirable, however, because they improve the sealing effect.

SUMMARY OF THE INVENTION

The goal of the present invention is to design a device of the type described above in such a way that the service life of the seal is increased.

This goal is achieved according to the invention in that the seal is designed with at least two different areas, the first area being made of a material which is harder than that of the second area, and in that the two areas are connected to each other so that they are incapable of relative movement.

Through the combination of a first area of a harder material with a second area of a softer material, it is possible to provide a surface profiling in the area of the softer material, if desired, and nevertheless to increase the stability of the seal through the presence of the harder material in such a way that especially the cracking of the softer material in the area of the recesses of the surface profiling is avoided or at least significantly reduced.

Low-cost production is promoted by making the first area out of a plastic.

A long-lasting sealing effect is promoted by making the second area out of an elastomeric material.

A simple barrier around the pressure zone is achieved by designing the seal as a closed, all-around sealing profile.

According to a typical embodiment, the seal is designed as part of the mold clamping system of the blowing station.

An effective arrangement is obtained by arranging the seal between the mold carrier and the blow mold.

To support the deformation of the seal under the action of pressure, it is proposed that the seal be designed as a lip seal.

Adequate mechanical support under the action of pressure is achieved by accommodating at least a certain part of the seal in a recess.

A good compromise between adequate strength and good deformability is achieved by allowing the first area to fill about 10-70% of the volume of the seal.

An advantageous design for absorbing the forces which act on the seal is achieved by providing the parting surface between the two areas with a dimensional component which is perpendicular to the base of the recess.

BRIEF DESCRIPTION OF THE DRAWING

In the drawings.

Exemplary embodiments of the invention are illustrated schematically in the drawings.

DETAILED DESCRIPTION OF THE INVENTION

Figure 1:
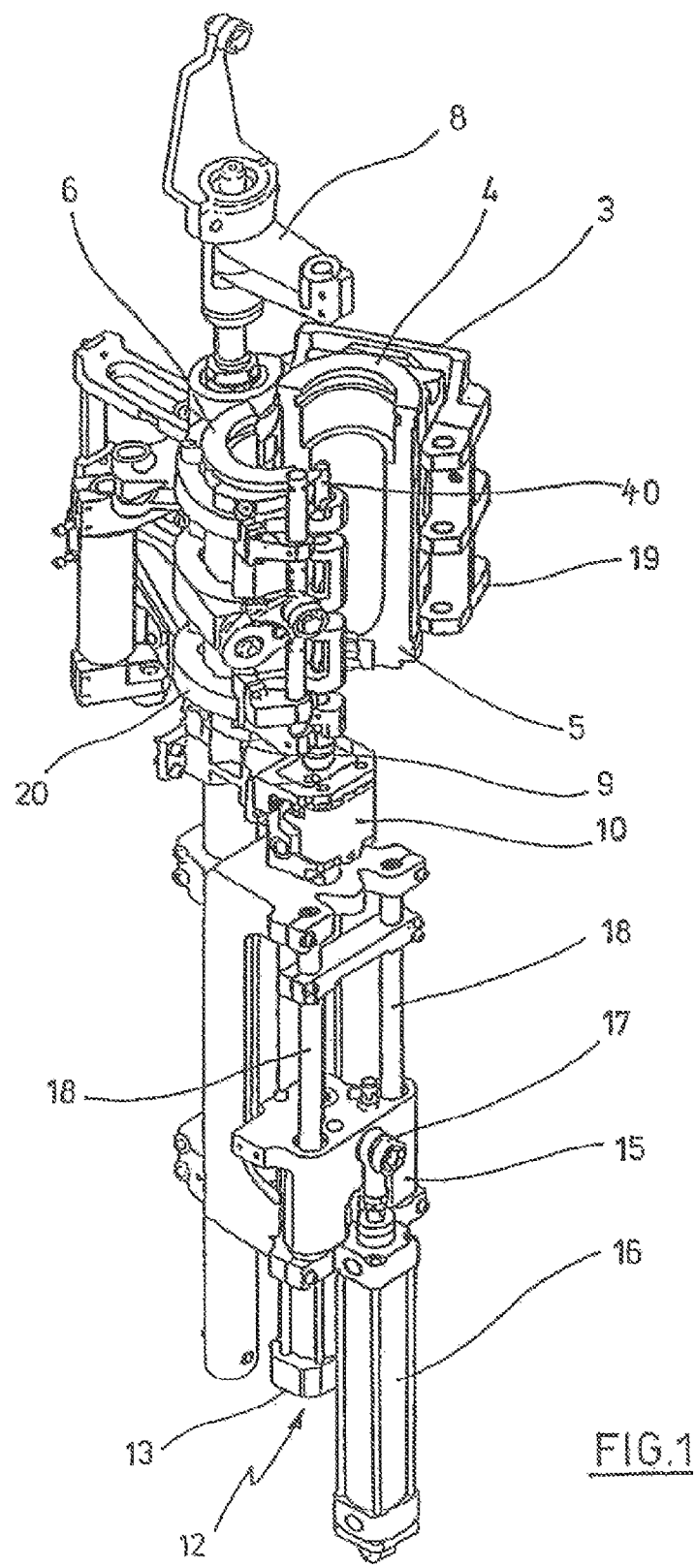
FIG. 1 shows a perspective view of a blow-molding station for the production of containers from parisons.
Figure 2:
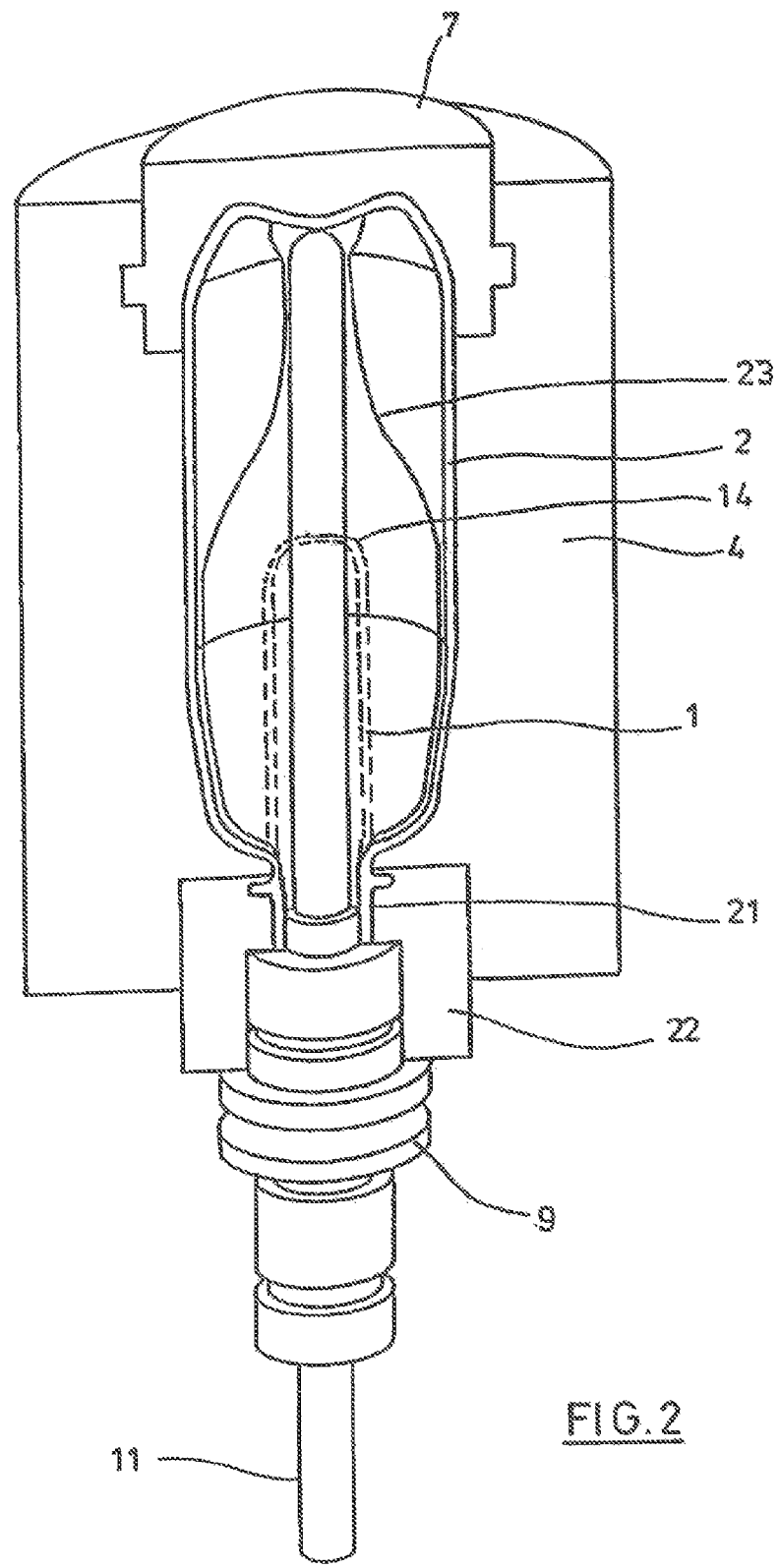
FIG. 2 shows a longitudinal section through a blow mold, in which a parison is stretched and expanded.

The basic design of a device for molding parisons 1 into containers 2 is shown in FIGS. 1 and 2.

The device for molding the container 2 consists essentially of a blow-molding station 3, which is provided with a blow mold 4, into which a parison 1 can be inserted. The parison 1 can be an injection-molded part of polyethylene terephthalate. So that the parison 1 can be inserted into the blow mold 4 and so that the finished container 2 can be removed from it, the blow mold 4 consists of two halves 5, 6 and a bottom part 7, which can be positioned by a lifting device 8. The parison 1 can be held in the area of the blow-molding station 3 by a transport mandrel 9, which, in common with the parison 1, passes through a plurality of treatment stations within the device. It is also possible, however, to insert the parison 1 directly into the blow mold 4 by the use of grippers, for example, or other handling means.

So that compressed air can be supplied, a connecting piston 10, which supplies the parison 1 with compressed air and simultaneously creates a seal against the transport mandrel 9, is installed underneath the transport mandrel 9. In a modified design, it is also possible in principle to use fixed compressed air supply lines.

In this exemplary embodiment, the parison 1 is stretched by means of a stretching rod 11, which is positioned by a cylinder 12. According to another embodiment, the stretching rod 11 is positioned mechanically by cam segments, which are actuated by gripping rollers. The use of cam segments is especially effective in cases where a plurality of blow-molding stations 3 is mounted on a rotating blow-molding wheel.

In the embodiment shown in FIG. 1, the stretching system is designed with a tandem arrangement 12 of two cylinders. Before the start of the actual stretching process, the stretching rod 11 is first moved by a primary cylinder 13 into the area of the bottom 14 of the parison 1. During the actual stretching process, a secondary cylinder 16 or a cam controller positions the primary cylinder 13, with its stretching rod extended, together with a sled 15, which carries the primary cylinder 13. In particular, it is envisioned that the secondary cylinder 16 can be controlled by a cam in such a way that the current stretching position is defined by a guide roller 17, which rolls over a curved surface during the course of the stretching process. The secondary cylinder 16 presses the guide roller 17 against the guide surface of the cam. The sled 15 slides along two guide elements 18.

After the mold halves 5, 6 arranged in the area of carriers 19, 20 have been closed, the carriers 19, 20 are locked together by means of a locking device 20.

To adapt the device to different shapes of the mouth section 21 of the parison 1, it is provided that separate threaded inserts 22 can be used in the area of the blow mold 4 as shown in FIG. 2.

In addition to the blown container 2, FIG. 2 also shows the parison 1, drawn in dotted line, and the developing container bubble 23, indicated schematically.

Figure 3:
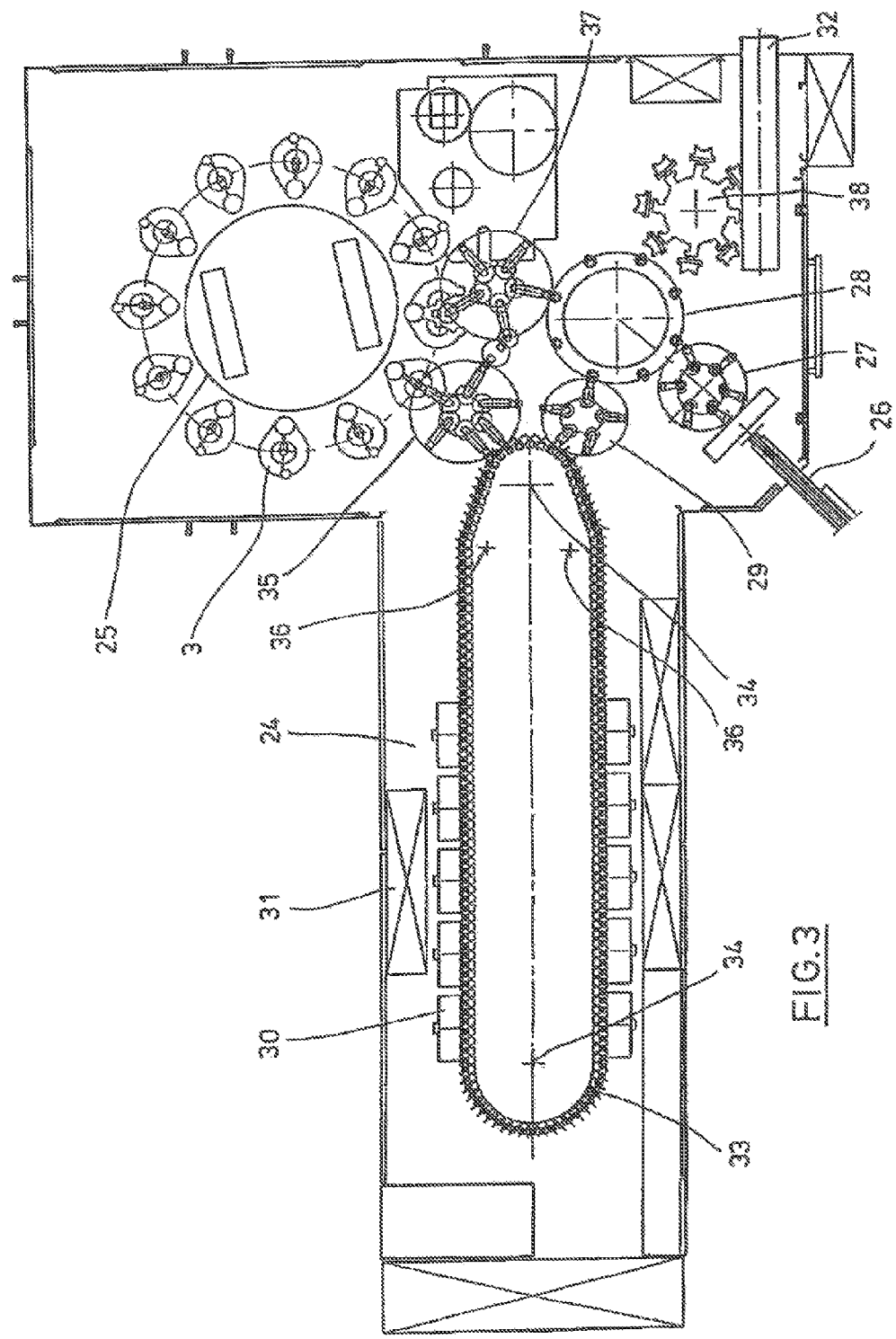
FIG. 3 is a sketch which illustrates a basic design of a device for blow-molding containers.

FIG. 3 shows the basic design of a blow-molding machine, which is provided with a heating section 24 and a rotating blowing wheel 25. Proceeding from a parison entrance point 26, the parisons 1 are transported by transfer wheels 27, 28, 29 into the area of the heating section 24. Heat radiators 30 and blowers 31 are arranged along the heating section 24 to temper the parisons 1. After the parisons 1 have been adequately tempered, they are transferred to the blowing wheel 25, in the area of which the blow-molding stations 3 are arranged. The finished blown containers 2 are sent to an exit section 32 by additional transfer wheels.

So that a parison 1 can be molded into a container 2 in such a way that the container 2 comprises material properties which ensure the ability of the food product, especially a beverage, packaged in the container 2 to remain consumable for long periods of time, special processing steps must be carried out during the heating and orientation of the parisons 1. In addition, advantageous effects can be achieved by fulfilling special requirements pertaining to the dimensions of the container.

Various plastics are suitable as the thermoplastic material. Examples of plastics which can be used include PET, PEN, and PP.

The parison 1 is expanded during the orientation process by the use of compressed air. The compressed air is supplied in two phases. In the preblowing phase, the gas, such as compressed air, is supplied at a low pressure, whereas, in the following main blowing phase, the gas is supplied at a higher pressure. During the preblowing phase, compressed air is typically supplied at a pressure in the range of 10-25 bars, whereas, during the main blowing phase, the compressed air is supplied at a pressure in the range of 25-40 bars.

It can also be seen in FIG. 3 that, in the case of the embodiment shown, the heating section 24 is made up of an endless row of transport elements 33, which are arranged like the links of a chain and which are guided by deflection wheels 34. What is envisioned in particular is that the chain-like arrangement extends around and thus defines an essentially rectangular shape. In the case of the embodiment shown here, a single deflection wheel 34 of relatively large dimensions is used in the area of the part of the heating section 24 which faces the transfer wheel 29 and a feed wheel 35; and two deflection wheels 36 of comparatively smaller dimensions are used in the area of the adjacent deflection points. Basically, however, any other type of guide arrangement is also possible.

So that the transfer wheel 29 and the feed wheel 35 can be arranged as closely together as possible, the arrangement shown has been found to be especially effective, because it allows the three deflection wheels 34, 36 to be positioned in the area of the corresponding part of the heating section 24; that is, the two smaller deflection wheels 36 are positioned in the area of the transition to the linear parts of the heating section 24, whereas the larger deflection wheel 34 is positioned directly at the transfer points to the transfer wheel 29 and to the feed wheel 35. As an alternative to the use of chain-like transport elements 33, it is also possible to use a rotating heating wheel, for example.

After the blow-molding of the containers 2 has been completed, they are taken away from the area of the blow-molding stations 3 by a removal wheel 37 and transported via the transfer wheel 28 and a delivery wheel 38 to the exit section 32.

Figure 4:
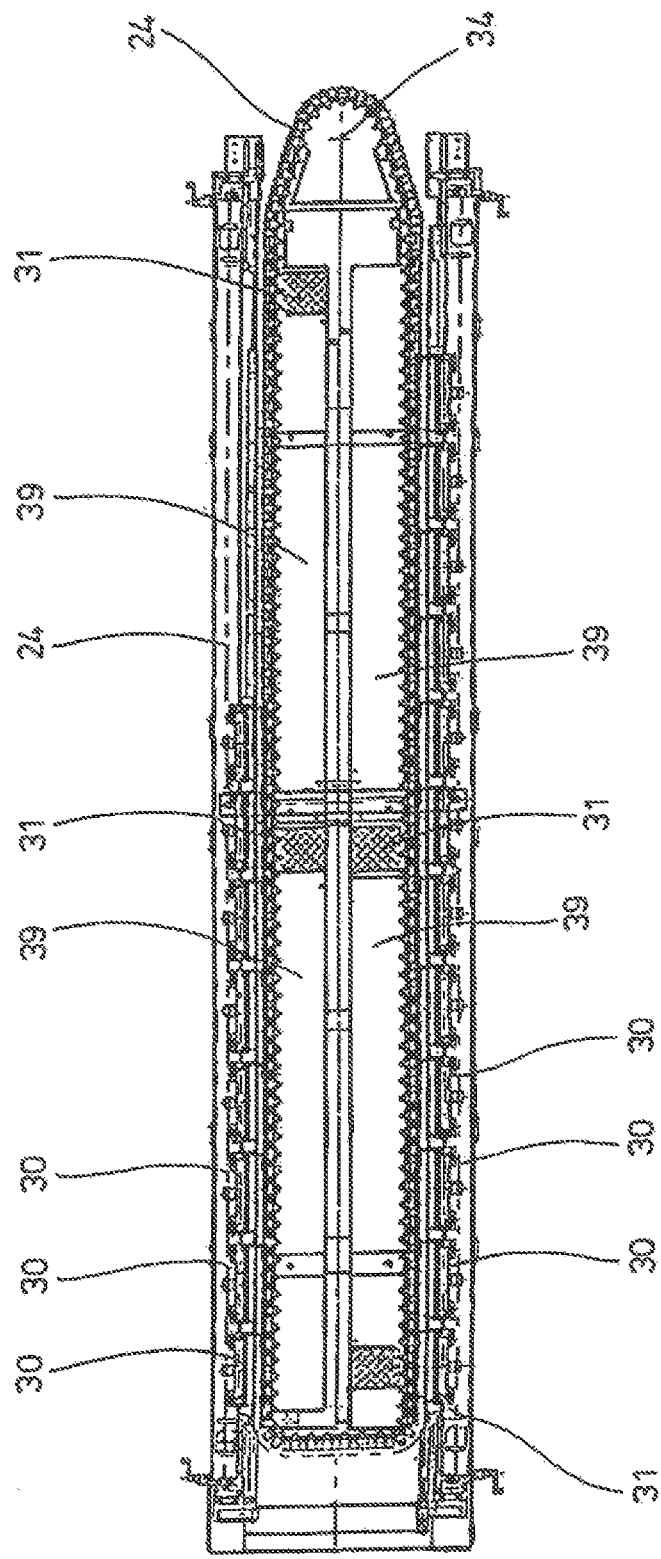
FIG. 4 shows a modified heating section with increased heating capacity.

In the modified heating section 24 shown in FIG. 4, the larger number of heat radiators 30 can temper a larger quantity of parisons 1 per unit time. The blowers 31 introduce cold air into the area of the cooling air channels 39 opposite the associated heat radiators 30 and discharge the cold air through exit openings. As a result of the arrangement of the outflow diredtions, the cooling air flows in a direction which is essentially transverse to a transport direction of the parisons 1. The surfaces of the cooling air channels 39 opposite the heat radiators 30 can be provided with reflectors for heat radiation; it is also possible to use the discharged cooling air to cool the heat radiators 30.

Figure 5:
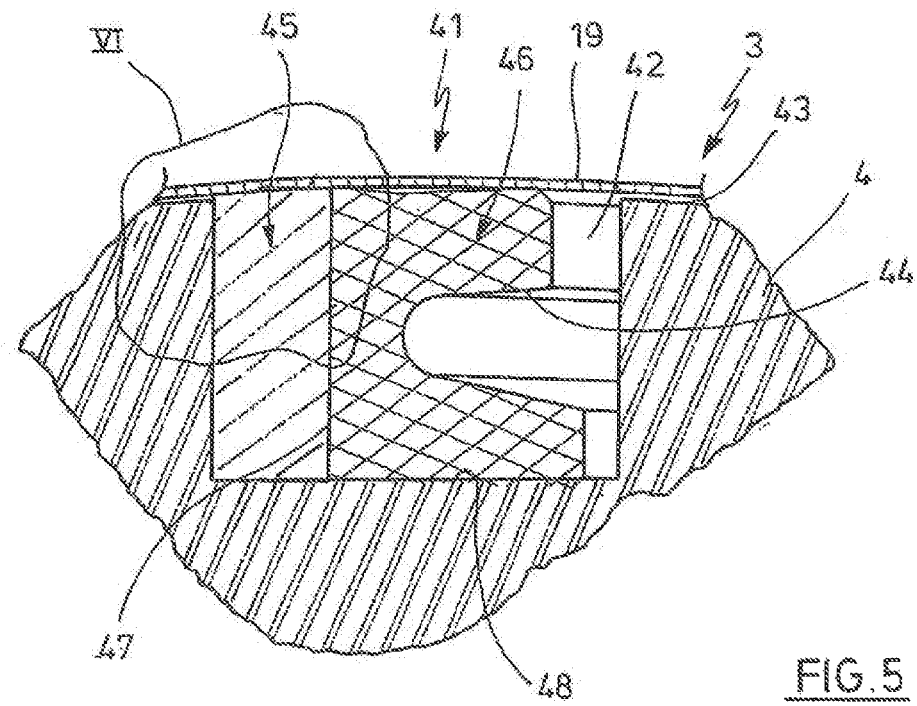
FIG. 5 shows a longitudinal section through a seal which has been inserted into a recess in a holder.

FIG. 5 shows a partial diagram of a cross section of a blow-molding station 3. A seal 41 is provided between a part of the blow mold 4 and the mold carrier 19. The seal is positioned in a recess 42 and extends continuously around a pressure zone 43, thus surrounding it on all sides. In the exemplary embodiment shown here, the seal 41 has a surface profile 44, which provides the seal 1 with a V-shaped contour. The recess of the V-profile is arranged so that it faces the pressure zone 43. As the pressure in the pressure zone 43 increases, the seal 41 is thus pressed more and more strongly against the mold carrier 19, so that an increase in pressure has the effect of increasing the effectiveness of the seal.

The seal 41 consists of a first area 45 and a second area 46, wherein the first area 45 consists of a material which is harder than that of the second area 46. The surface profile 44 is arranged in the vicinity of the second area 46 made of the softer material.

A parting surface 47 between the areas 45, 46 has a directional component which is perpendicular to a base surface 48 of the recess 42. Basically, however, an arrangement in which the parting surface forms an angle to the base surface 48 is also possible. According to another embodiment, the parting surface 47 is not essentially flat but has instead a non-flat profile. FIG. 5 shows an embodiment in which the parting surface 47 is essentially perpendicular to the base surface 48.

FIG. 5 shows also an exemplary embodiment in which the surfaces of areas 45, 46 which face each other are of essentially the same size. Basically, however, it is also conceivable that the facing surfaces of the areas 45, 46 could be of different sizes.

It can also be seen in FIG. 5 that the first area 45 made of the harder material projects above the recess 42 and extends all the way to the mold carrier 19. An embodiment such as this offers the advantage that, even when pressure is acting on the soft area 46, this area cannot be pressed into a resulting gap. This prevents so-called "gap extrusion" in the area of the side of the seal 41 facing away from the pressure.

PUR, for example, can be used as the material for the first area 45. HNBR can be used as the material for the second area 46. Basically, solid plastics or metals are suitable for the first area 45, and elastomeric materials in particular are suitable for the second area 46.

Figure 6:
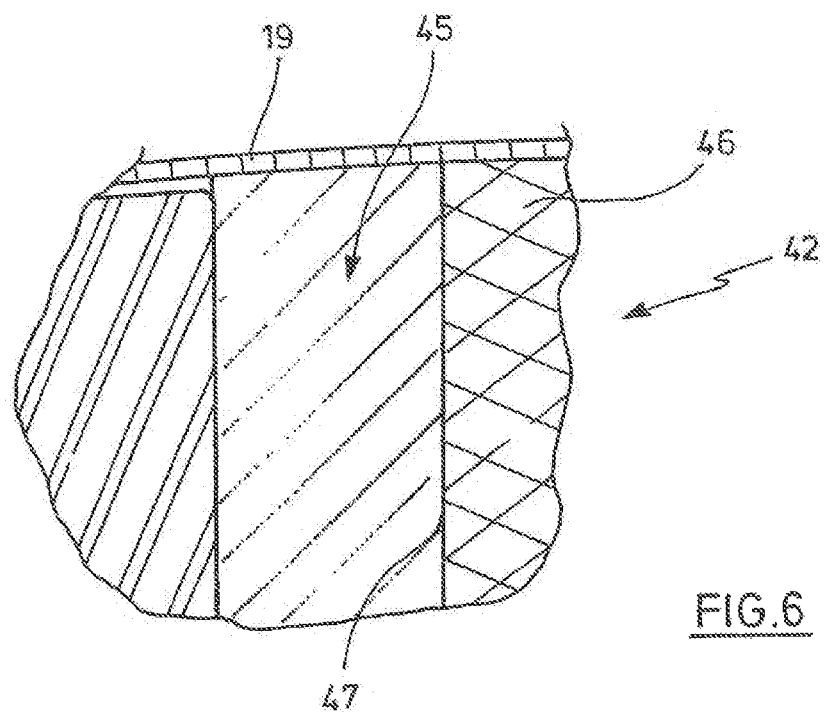
FIG. 6 shows an enlarged diagram of detail VI in FIG. 5.

FIG. 6 shows an enlarged diagram of detail "VI" in FIG. 5. It can be seen in particular how the first area 45 extends out from the recess 42 and contacts the mold carrier 19.

The degree to which the first area 45 extends out of the recess 42 is characterized in FIGS. 5 and 6 by a projection 49.

Figure 7:
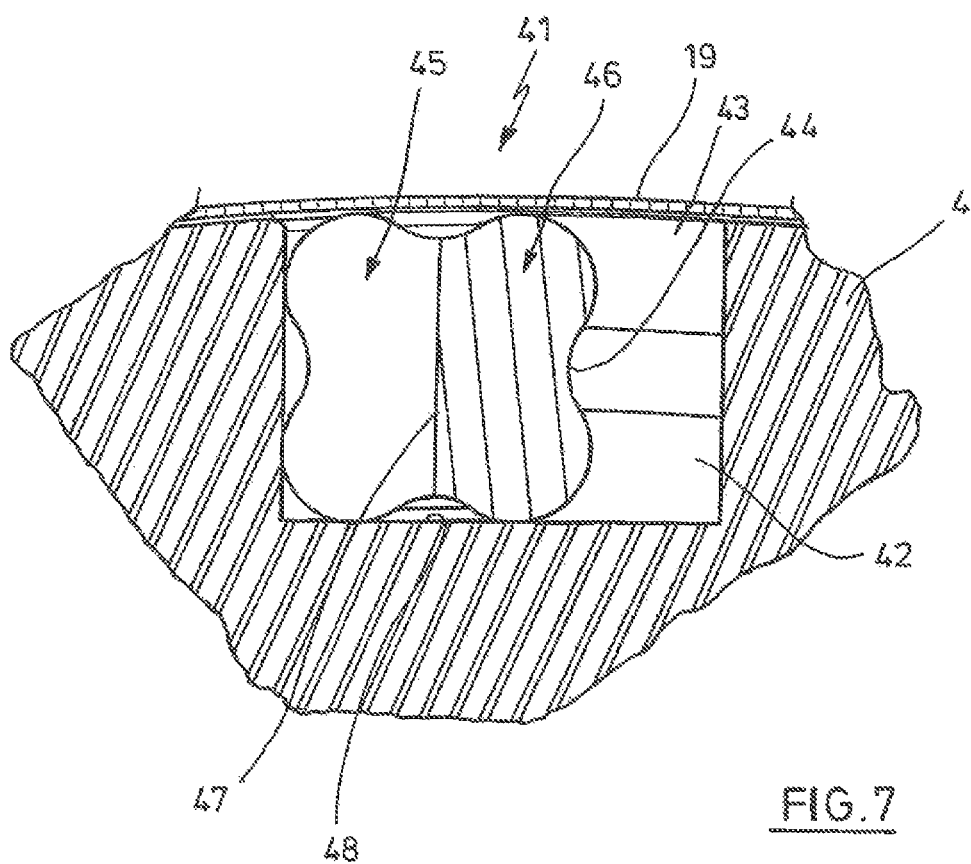
FIG. 7 shows a diagram similar to FIG. 5 with a modified sealing profile.

FIG. 7 shows a modified embodiment of the seal 41. The surface profile 44 is less pronounced here than in the embodiment according to FIG. 5, but it extends around all four sides of the seal 41, which is provided with an approximately square outline. According to the embodiment in FIG. 7, the areas 45, 46 are approximately of the same size.

Both in the embodiment according to FIG. 5 and in the embodiment according to FIG. 7, the first area 45 made of the harder material faces away from the pressure zone 43, and the second area 46 made of the softer material is arranged to face the pressure zone 43. As a result, when the pressure is being exerted, the softer material is pressed against the harder material, as a result of which, first, sufficient stability is achieved, and, second, the sealing effect is increased.

The closed, all-around course of the seal 41 can have almost any desired contour. Continuous courses are preferred, however, because this avoids nonuniform force distributions. For example, it is possible for the seal to have a circular contour like an O-ring. Also conceivable, however, are oval or rectangular courses. Courses with a polygonal contour preferably have rounded transitions at the corners.

Both in the embodiment according to FIG. 5 and in the embodiment according to FIG. 7, the surface profile 44 allows the pressure being exerted on the pressure zone 43 to expand the seal 41 between the base surface 48 and the corresponding contact surface of the mold carrier 19. The expansion improves the sealing effect, and as the pressure increases, so does the effectiveness of the seal.

According to a typical embodiment, the blow mold 4 consists of inner shells and outer shells. The inner shells comprise the individual contour of the container 2 to be produced. The outer shells accommodate channels for tempering agent, if desired, or other tempring elements and provide the necessary mechanical stability. The seal 41 is typically positioned in the transition area between the outer shells and the mold carriers 19, 20.

There are various methods which can be used to connect the areas 45, 46 to each other. For example, it is possible to bond the areas 45, 46 to each other with an adhesive after the areas 45, 46 have first been produced independently of each other. It is also possible, however, to produce the areas 45, 46 by the so-called overmolding method in a common production step.

The invention claimed is:

1. A device for blow-molding containers, comprising: at least one blow-molding station with a blow mold, where the blow mold is held by a carrier of the blow-molding station; and a sealing for sealing off a pressure zone from the environment, wherein the seal has at least two areas, a first area being made of a material harder than a material of the second area, the two areas being connected to each other so that the two areas are incapable of relative movement, the first area made of the harder material facing away from the pressure zone and the second area made of the softer material facing the pressure zone.

2. The device according to claim 1, wherein the first area consists of a plastic.

3. The device according to claim 1, wherein the second area consists of an elastomeric material.

4. The device according to claim 1, wherein the seal forms a closed peripheral sealing profile.

5. The device according to claim 1, wherein the seal is part of a mold-clamping system of the blow-molding station.

6. The device according to claim 1, wherein the seal is arranged between a mold carrier and the blow mold.

7. The device according to claim 1, wherein the seal is a lip seal.

8. The device according to claim 1, wherein the first area fills approximately 10-70% of a volume of the seal.

9. The device according to claim 1, wherein a parting surface between the areas has a directional component perpendicular to a base surface of the recess.

10. The device according to claim 1, wherein at least part of the seal is accommodated in a recess in the blow mold.

* * * * *